United States Patent [19]

Moyer et al.

[11] Patent Number: 4,971,492

[45] Date of Patent: Nov. 20, 1990

[54] WHEEL STRAP SNAP HANGER WITH FLEXIBLE FINGERS

[76] Inventors: Donald L. Moyer, 5753 N. 80th St., Omaha, Nebr. 68134; Thomas O. Allred, 10311 Adams St., Omaha, Nebr. 68127

[21] Appl. No.: 346,516

[22] Filed: May 2, 1989

[51] Int. Cl.[5] .............................. B60P 3/06; F16B 1/00
[52] U.S. Cl. ........................................ 410/9; 403/71; 410/20
[58] Field of Search ...................... 410/9-11, 410/20-23, 26, 30, 89, 142, 141; 403/71; 24/625, 606, 607

[56] References Cited

U.S. PATENT DOCUMENTS

| | | | |
|---|---|---|---|
| 3,552,551 | 1/1971 | Goldberg et al. | 220/334 X |
| 4,343,401 | 8/1982 | Paulyson | 410/23 X |
| 4,427,328 | 1/1984 | Kojima | 24/625 X |
| 4,579,473 | 4/1986 | Brugger | 403/71 X |
| 4,786,223 | 11/1988 | Crissy et al. | 410/10 X |

Primary Examiner—Robert J. Oberleitner
Attorney, Agent, or Firm—John A. Beehner

[57] ABSTRACT

A wheel strap snap hanger of the invention includes an elongated tubular shank having a rearward flange on one end and a plurality of flexible fingers extending longitudinally rearwardly therefrom. Each finger includes a stem portion connecting the rearward flange to a head portion of greater diameter than the stem portion and spaced from the rearward flange to define a peripheral plate member receiving groove for positive snap fit retention of the snap hanger onto the edge of a hole through a plate member. The flexible fingers are separated by axial slots which extend forwardly through the rearward flange and into the shank. An outer portion of the rearward surface of the rearward flange is inclined outwardly and forwardly to prevent rearward bending of the flange during insertion of the snap hanger. A removable hollow plug insert is alternately adapted for use as a tool for removing the plug insert from a plate member on which it is installed.

25 Claims, 5 Drawing Sheets

WHEEL STRAP SNAP HANGER WITH FLEXIBLE FINGERS

BACKGROUND OF THE INVENTION

The present invention is directed generally to a snap hanger adapted to be manually snap fit into a hole in a plate member for supporting an apparatus suspended thereon and more particularly to a wheel strap snap hanger adapted for snap fit retention within a hole in the metal side screen of a railroad automobile transport car for supporting wheel securement straps and/or wheel chocks when not in use.

A conventional system for securing automobiles in place within a multilevel auto rack railway car includes a wheel strap which engages the upper portion of a wheel and has its opposite ends secured to wheel chocks, adjustably situated on a track running longitudinally through the car. When the straps are not in use, it is desirable to store them within the car close to where they will be used for ready access when next needed. If they are simply left on the floor of the railway car, they may slide away from the desired position and possibly be lost from the car. One solution is to place the keyhole slot in the end bracket of the wheel strap onto a bolt extended through a hole in the railway car side screen with its head protruding interiorly of the car. The installation of such bolts is inconvenient and very time consuming, however, because the side screen blocks access to both ends of the bolt with the result that installation of the bolts is necessarily a two-man operation.

Accordingly, a primary object of the invention is to provide a snap hanger which may be readily press fit into a plate member hole from one side for secure retention therein.

Another object is to provide such a snap hanger with an article supporting shank having a forward flange to retain an article thereon, a rearward flange adapted for abutment against the plate member and a plurality of compressible fingers protruding rearwardly from the rearward flange and separated by slots extending forwardly through the rearward flange and into the shank to facilitate compression of the flexible fingers for insertion into a plate member opening.

Another object is to provide such a snap hanger wherein the rearward flange has a rearward surface with an outer portion which is inclined outwardly and forwardly to prevent interference with insertion of the compressible fingers into the plate member hole.

Another object is to provide such a snap hanger with a removable plug insert for preventing removal of the hanger from the plate member when the insert is installed within the hanger.

Another object is to provide such a snap hanger with a plug insert that alternately functions as a tool for removing an inserted plug from a side screen hole.

Another object is to provide such a snap hanger which is simple and rugged in construction, economical to manufacture and efficient in operation.

SUMMARY OF THE INVENTION

The wheel strap snap hanger of the present invention is adapted for press-fit insertion into a hole in the perforated side screen plate number of a multilevel auto rack railway car. The snap hanger includes a tubular shank having a rearward flange on its rearward end to provide a collar for abutment against the side screen plate member. A plurality of flexible fingers extend rearwardly from the rearward flange with each finger including a stem portion connected to the rearward flange and a head portion of greater diameter than the stem portion and spaced rearwardly from the rearward flange by a dimension substantially equal to the thickness of the side screen to define a peripheral side screen receiving groove between the head portion and rearward flange. The outer surface of each flexible finger head portion is tapered rearwardly and inwardly to facilitate compression of the fingers together upon press fitting of said fingers into a side screen hole. The flexible fingers are separated by respective axial slots which extend axially forwardly between the fingers and through the rearward flange and into the shank such that the rearward flange is inclined rearwardly in response to compression of the fingers toward one another. An outer portion of the rearward surface of the rearward flange is inclined outwardly an forwardly to prevent interference with substantially full insertion of the fingers into the side screen hole upon rearward bending of the rearward flange. The fully inserted fingers snap apart to secure the snap hanger on the side screen which substantially fills the peripheral groove between the finger head portions and rearward flange.

A separate tubular plug insert is adapted for insertion through the shank, rearward flange and fingers to prevent compression of the fingers toward one another, thereby preventing removal of the snap hanger from the side screen. When it is desired to relocate the snap hanger on the side screen, the plug insert is removed from the shank and its open tubular end may be forced onto the tapered surfaces of the flexible fingers to compress them together and push them out of the side screen hole.

The snap hanger of the invention is quickly and easily insertable into any selected side screen hole by a single worker from inside the railway car with no need for access to the outer surface of the side screen. The installed snap hanger affords convenient and secure storage of a wheel chock closely adjacent its intended point of use within a multilevel auto rack railway car.

DESCRIPTION OF THE PREFERRED EMBODIMENT

Figure 1:
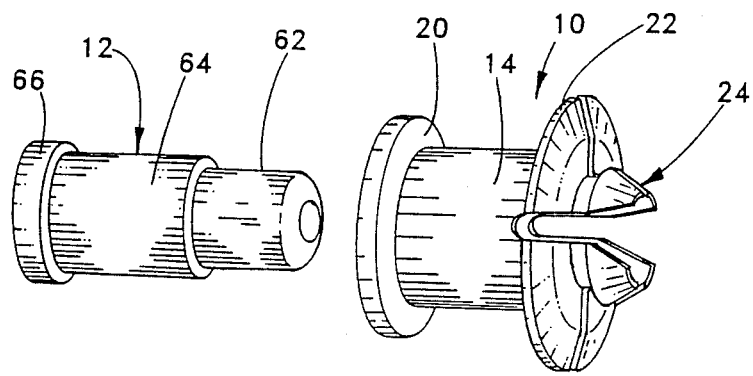
FIG. 1 is an exploded perspective view of the snap hanger of the invention.
Figure 2:
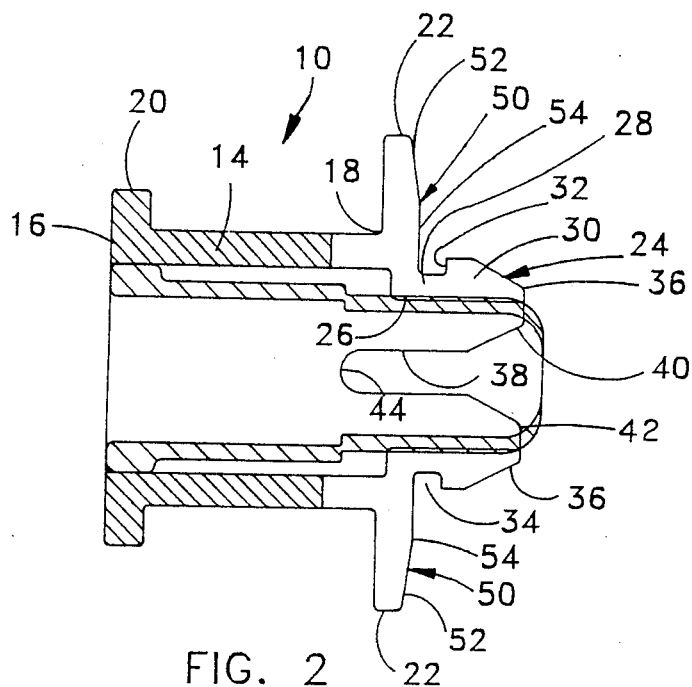
FIG. 2 is an enlarged sectional view through the snap hanger with the plug insert therein.
Figure 3:
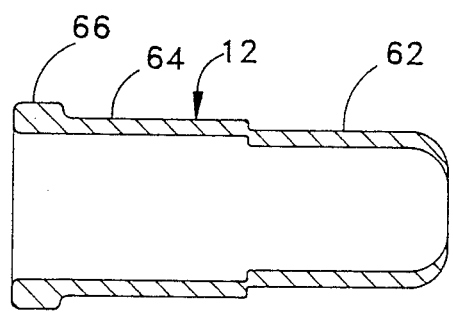
FIG. 3 is a side sectional view through the plug insert of the invention.

Snap hanger 10 of the invention is shown is FIGS. 1-3 in combination with an accessory plug insert 12.

Snap hanger 10, in the preferred embodiment, includes an elongated tubular shank 14 having forward and rearward ends 16 and 18, a forward flange 20, a rearward flange 22 and a plurality of flexible fingers 24 protruding rearwardly from the rearward flange 22. Whereas all portions of the snap hanger 10 are illustrated as being cylindrical or circular in cross section, the snap hangers could be formed in various tubular shapes.

Shank 14 provides the protrusion onto which a wheel strap or wheel chock can be supported. Forward flange 20, which preferably surrounds shank 14, prevents slippage of the wheel strap or chock off of the shank. Rearward flange 22 acts as a collar for abutment against a railway car side screen and the flexible fingers 24 are insertable through a side screen hole and act to securely engage the snap hanger thereon.

Rearward flange 22 likewise preferably surrounds shank 14 and protrudes radially outwardly therefrom adjacent the rearward end 18 of shank 14. Rearward flange 22 also protrudes radially inwardly from the shank 14 to partially define a flange opening 26 of smaller diameter than the smallest inner diameter of shank 14.

A plurality of flexible fingers 24, four in the preferred embodiment, extend longitudinally rearwardly from the rearward flange 22. Each finger 24 includes a stem portion 28 connected to rearward flange 22 and a head portion 30 of greater diameter than stem portion 28 so as to present an upright annular shoulder 32 which is spaced rearwardly from rearward flange 22 by a dimension substantially equal to the thickness of the plate member through which the snap hanger is to be inserted. Shoulder 32, stem portion 28 and rearward flange 22, collectively define a peripheral plate member receiving groove 34 which is adapted to be substantially filled by the plate member on which the snap hanger is installed. Each head portion 30 has an outer surface 36 which tapers rearwardly and inwardly in the form of a wedge to facilitate compression of the flexible fingers together. The inside diameter of the stem portion 28 and head portion 30 is preferably uniform.

Figure 4:
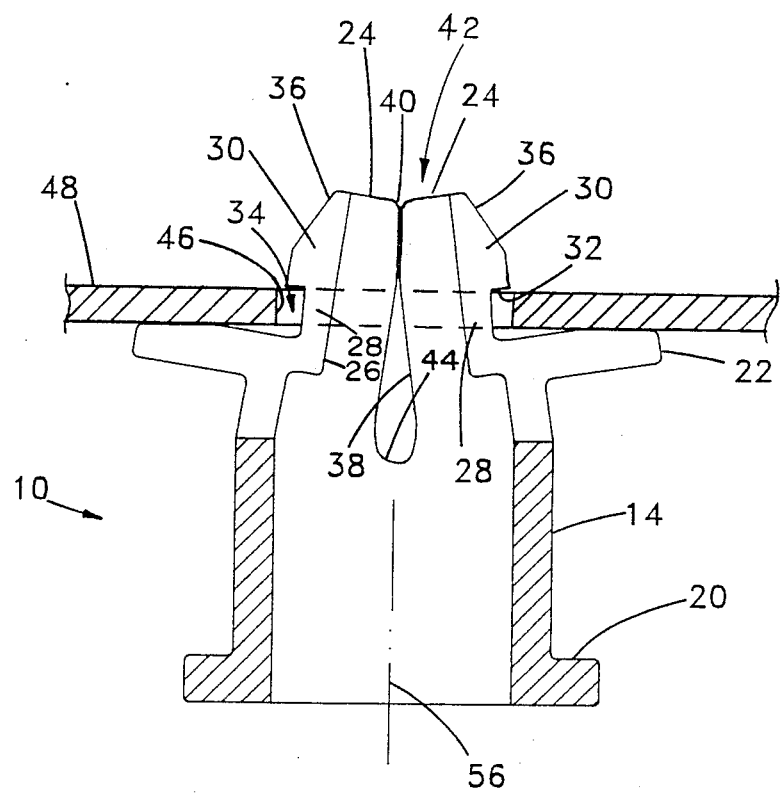
FIG. 4 is a side sectional view of the snap hanger being snap fit into a railway car side screen hole.

The flexible fingers 24 are separated by respective axial slots 38 which extend axially forwardly between the fingers 24 and through the rearward flange 22 and into shank 14 from an open end 40 at the free rearward end 42 of fingers 24 to a closed end 44 situated axially forwardly of rearward flange 22. Accordingly, a degree of flexibility is imparted to the hanger such that the outer portion of rearward flange 22 is inclined and displaced rearwardly in response to compression of the flexible fingers 24 toward one another as illustrated in FIG. 4.

To prevent interference with full insertion of the flexible fingers into hole 46 (FIG. 4) of side screen 48, the rearward surface 50 of rearward flange 22 has an outer portion 52 which is inclined outwardly and forwardly. An inner portion 54 is normally disposed perpendicular to the central axis 56 through the snap hanger for flush engagement against side screen 48 when the snap hanger 10 is fully press fit therein.

Snap hanger 10 is preferably mad relatively stiff high impact of plastic materials such as XENOY. The design of the hanger which includes peripheral groove 34 of a width to match the thickness of the metal plate onto which the snap hanger is fastened, combined with the relatively stiff plastic material enables the snap hanger to be securely self supporting without the need for a plug insert to block compression of the fingers together. Without any insert, the snap hanger can support a static load of approximately three hundred (300) pounds. Downward forces on shank 14 cause the shoulder 32 of the top finger to bear against the rearward surface 58 (FIG. 5) of side screen 48 in an axial direction. Likewise, the bottom of inner portion 54 of the rearward flange rearward surface 50 is pressed against the forward or interior surface of side screen 48 in an axial direction, thereby minimizing any radial components of force which tend to collapse the fingers 24 together.

Nevertheless, an accessory plug insert 12 is available for use with snap hanger 10 and is effective to increase the static load capability of the hanger to approximately nine hundred (900) pounds. Plug insert 12 is shown is FIGS. 1 and 3 as a generally stepped tubular member including a tubular rearward portion 62 of slightly greater diameter than the flange opening 26 through rearward flange 22 and fingers 24 for a press fit retention of the insert within the flange opening as shown in FIG. 2. An intermediate portion 64 is of greater diameter than rearward portion 62 but smaller diameter than the inner diameter of shank 14 to facilitate insertion therein. A short forward portion 66 has an outer diameter substantially equal to the inner diameter of shank 14 for telescopic receipt therein. The plug insert 12 may be longer than snap hanger 10, as shown in FIG. 2, to assure complete contact between rearward portion 62 of the insert and the full length of the fingers 24 and rearward flange 22. When fully installed, the rearward end of insert 12 is flush with the rearward surface of shank 14 so that there is no protrusion which could be caught or jarred to cause accidental removal of the plug insert from the hanger.

Plug insert 12 is preferably made of a different plastic material than the snap hanger 10 to prevent any tendency of similar plastics to adhere together. Polyethylene is a suitable material for the plug insert 12.

Figure 7:
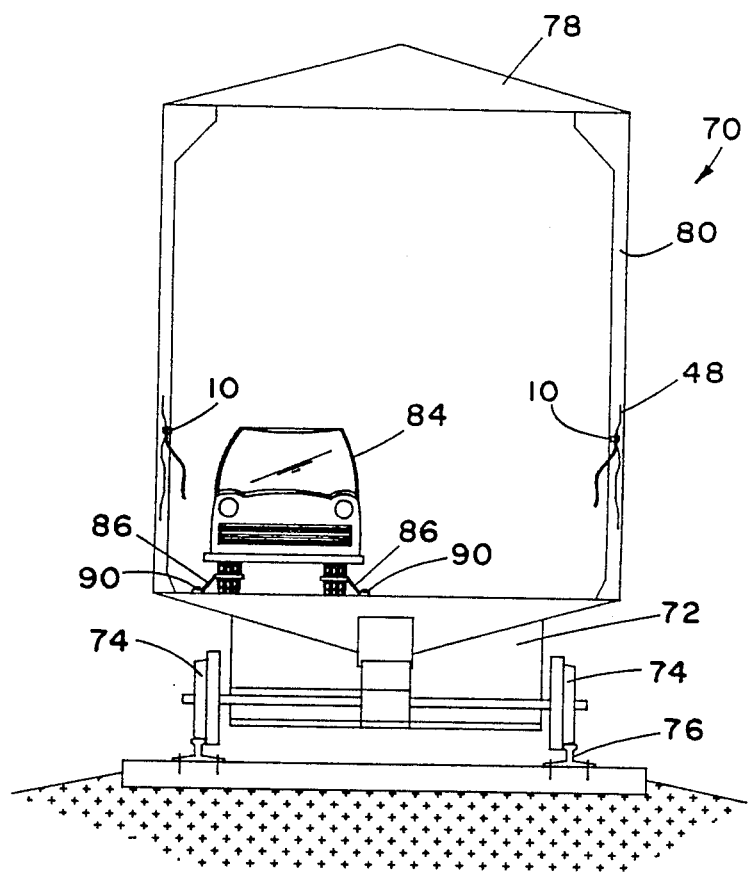
FIG. 7 is a transverse sectional view through a multilevel auto rack railway car showing wheel strap supported on the side screen thereof.

The environment for which the snap hanger 10 of the invention was originally intended will be described with reference to FIGS. 7-9. 70 is a diagrammatic showing of a multilevel auto rack railway car having trucks 72 with wheels 74 which roll along conventional railroad tracks 76. Car 70 further includes a top wall 78 which is supported by a plurality of upright longitudinally spaced apart frame members 80. The spaces between frame members are substantially closed by perforated side screen plate members 48 which include a plurality of holes 46.

Within the railway car 70, an automobile 84 is secured in place by a wheel strap 86 placed over each tire, each strap having end brackets 88 which are engaged by respective wheel chocks 90 which are longitudinally adjustably positioned along rails (not shown, running the length of the floor of the railway car).

Figures 8, 9:
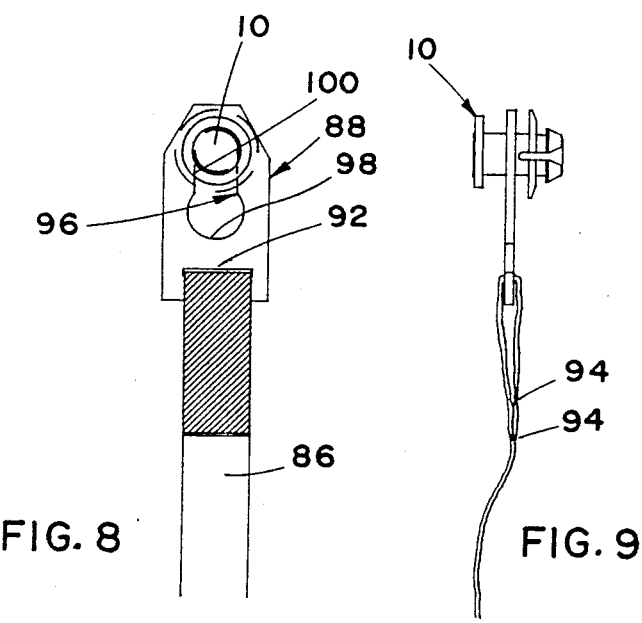
FIG. 8 is a partial elevational view of a wheel strap supported on a snap hanger of the invention.
FIG. 9 is a side view of wheel strap on the snap hanger of the invention.

FIGS. 8 and 9 illustrate a typical wheel strap 86 wherein one end is inserted through a slot 92 in end bracket 88 and folded back on itself and stitched at 94. A keyhole shaped opening 96 in bracket 88 includes a large diameter end portion 98 adapted to fit over the forward flange 20 of snap hanger 10 and an elongated slot portion 100 preferably of a diameter slightly greater than the outside diameter of shank 14 and smaller than the outside diameter of forward flange 20 for secure support of the wheel strap on the snap hanger 10. A similar keyhole shaped opening may be provided in the chock 90 itself for support on a snap hanger when not in use. This would be advantageous for eliminating the storage boxes which otherwise create an obstruction along the floor of the railway car.

Figures 5, 6:
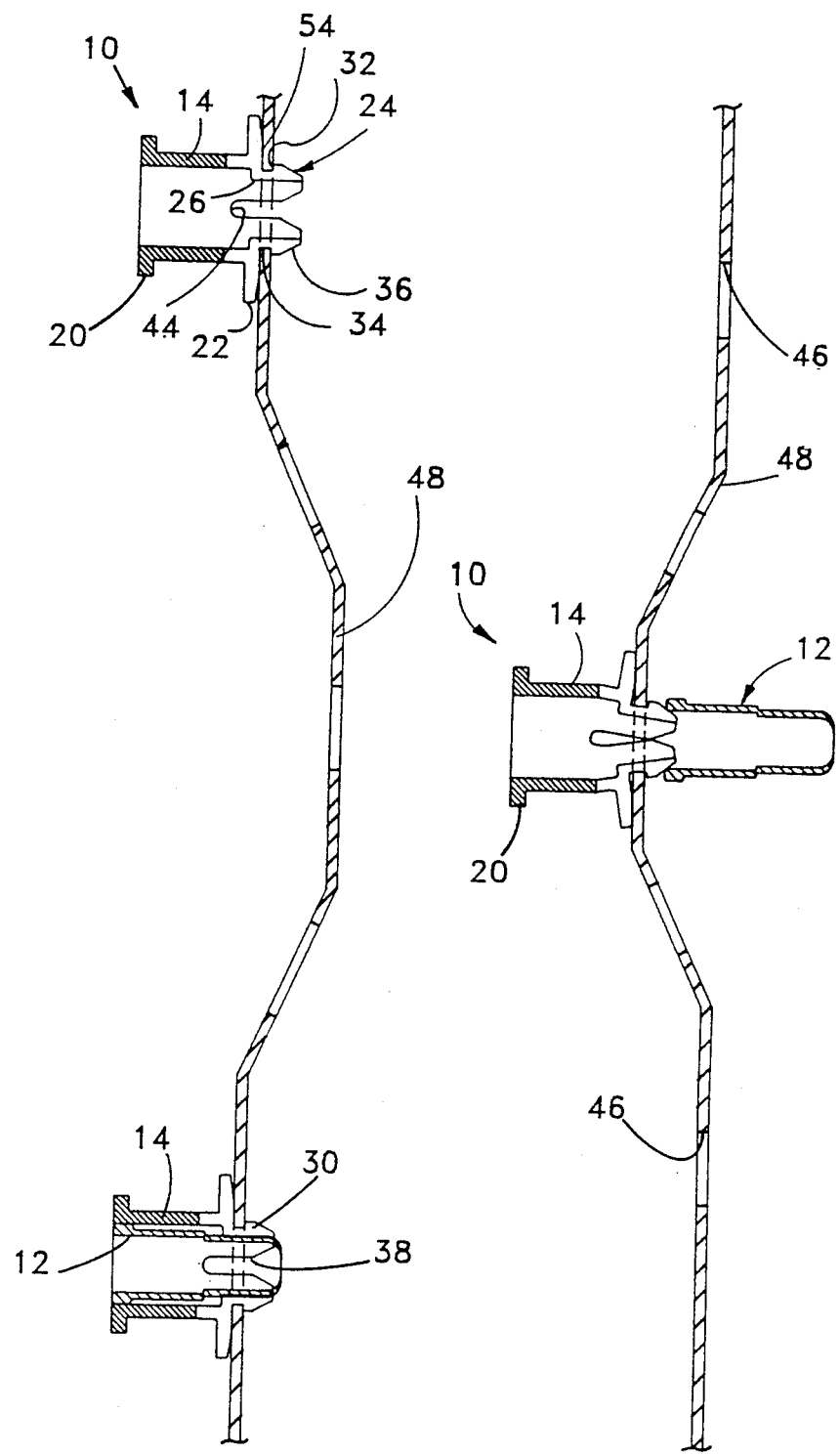
FIG. 5 is a side sectional view showing a pair of snap hangers installed in selected holes of a railway car side screen, the lower snap hanger including the plug insert therein.
FIG. 6 is a side sectional view showing use of the withdrawn plug insert for compressing the snap hanger fingers for removal of the hanger from a side screen hole.

To install a snap hanger 10 into a side screen hole 46, the flexible fingers 24 are engaged within the hole. It may be possible to lift and rotate the hanger to thereby engage the underside of hole 46 within the snap hanger groove 34. In any event, upon forcing the snap hanger axially toward the side screen, the wedge-shaped head portions 30 of the flexible fingers cause them to be compressed together partially or fully closing slots 38 to the extent that the compressed fingers fit through hole 46, as shown in FIG. 4. At that stage, it is important that the rearward flange outer portion 52 is inclined forwardly and outwardly to prevent interference with insertion of the fingers when the rearward flange is bent forwardly. Once the head portions clear side screen 48, the design of the snap hanger and resiliency of the material causes the fingers to snap apart thereby securely engaging the side screen 48 within groove 34 as shown in FIG. 5. The snap hanger is axially retrained by flush engagement of the rearward flange inner portion 54 against the interior surface of side screen 58 and flush engagement of shoulder 32 of finger head portions 30 against the exterior surface of the side screen.

Plug insert 12 may then be inserted rearwardly through the shank 14, rearward flange and fingers 24 as illustrated in FIG. 5 both to increase the load capacity of the hanger and to be available for removal of the hanger. Upon withdrawal of the plug insert 12 from snap hanger 10, the open forward end of the tubular plug insert may be used as a tool, as illustrated in FIG. 6, for removing the snap hanger from the side screen. The open forward end is pressed onto the wedge-shaped head portions of fingers 24 to collapse them toward one another to the extent that they can be pushed outwardly through hole 46.

Whereas the invention has been shown and described in connection with a preferred embodiment thereof, it is understood that many modifications, substitutions and additions may be made which are within the intended broad scope of the appended claims. Whereas the size of the snap hanger is not critical to the invention, railway car side screens are typically 16 gauge plate members. Accordingly, a preferred width of groove 34 is 0.093 inches. The inclination of rearward flange outer portion 52 to inner portion 54 is preferably ten (10) degrees which corresponds to the expected forward bending of the rearward flange during insertion of a snap hanger into side screen hole 46. The interference fit between plug insert 12 and flange opening 26 may be 0.001 inches.

It may be advantageous to dye the plastic material of snap hanger 10 a fluorescent color so as to be easily located with a flashlight during use at night. A material of the snap hanger should be of high quality to maintain its integrity at low temperatures and to resist stretching on impact.

Thus there has been shown and described a wheel strap snap hanger which accomplishes at least all of the stated object.

We claim:

1. A wheel strap snap hanger adapted for press fit insertion into a hole in a plate member for releasable retention therein, comprising
    an elongated tubular shank having forward and rearward ends,
    a rearward flange substantially surrounding said shank and protruding radially outwardly from the rearward end thereof to provide a collar for abutment against said plate member,
    said rearward flange also protruding radially inwardly from the rearward end of said shank to partially define a flange opening of smaller diameter than the smallest inner diameter of said shank,
    a plurality of flexible fingers extending longitudinally rearwardly from said rearward flange, each finger including a stem portion connected to said rearward flange and a head portion of greater diameter than said neck portion and spaced rearwardly from said outer flange to define a peripheral plate member receiving groove therebetween, said head portion having an outer surface which tapers rearwardly and inwardly,
    said flexible fingers being separated by respective axial slots which extend axially forwardly between said fingers and through said rearward flange and into said shank from an open end at the free rearward end of said fingers to a closed end situated axially forwardly of said rearward flange whereby said rearward flange is inclined rearwardly in response to compression of said fingers toward one another,
    said rearward flange having a rearward surface with an outer portion which is inclined outwardly and forwardly to prevent interference with substantially full insertion of said fingers into said plate member hole upon rearward bending of said rearward flange.

2. The snap hanger of claim 1 further comprising a separate plug insert adapted for rearward insertion through said shank, rearward flange and fingers and operative to prevent compression of said fingers toward one another for removal of said hanger from said plate member.

3. The hanger of claim 2 wherein said plug insert includes a tubular rearward portion of slightly greater diameter than said flange opening for a press fit retention of said rearward portion within said flange opening.

4. The hanger of claim 3 wherein said plug insert further includes a forward portion having an outer diameter substantially equal to the inner diameter of said shank for telescopic receipt therein.

5. The hanger of claim 4 wherein said insert has an open forward end which, upon removal from said hanger, is adapted to be press fit over the tapered head portions of said flexible fingers to compress said fingers together for removal of the hanger from a plate member hole.

6. The snap hanger of claim 2 wherein said shank, rearward flange and flexible fingers are integral portions of a unitary plastic member.

7. The snap hanger of claim 6 wherein said plug insert is formed of a different plastic than said shank, flange and fingers to prevent adherence thereto.

8. The hanger of claim 1 wherein said shank further includes a forward flange projected radially outwardly therefrom adjacent the forward end thereof.

9. The snap hanger of claim 8 wherein said shank and forward flange are each substantially cylindrical.

10. The snap hanger of claim 1 wherein said flexible fingers are four in number and are separated by four axial slots.

11. In combination,
a plate member having a hole therein, and
a wheel strap snap hanger adapted for press-fit insertion into said hole for releasable retention therein, comprising an elongated tubular shank having forward and rearward ends,
a rearward flange substantially surrounding said shank and protruding radially outwardly from the rearward end thereof to provide a collar for abutment against said plate member,
said rearward flange also protruding radially inwardly from the rearward end of said shank to partially define a flange opening of smaller diameter than the smallest inner diameter of said shank,
a plurality of flexible fingers extending longitudinally rearwardly from said rearward flange, each finger including a stem portion connected to said rearward flange and a head portion of greater diameter than said neck portion and spaced rearwardly from said outer flange by a dimension substantially equal to the thickness of said plate member to define a peripheral plate member receive groove therebetween, said head portion having an outer surface which tapers rearwardly and inwardly,
said flexible fingers being separated by respective axial slots which extend axially forwardly between said fingers and through said rearward flange and into said shank from an open end at the free rearward end of said fingers to a closed end situated axially forwardly of said rearward flange whereby said rearward flange is inclined rearwardly in response to compression of said fingers toward one another, and said rearward flange having a rearward surface with an outer portion which is inclined outwardly and forwardly to prevent interference with substantially full insertion of said fingers into said plate member hole upon compression of said fingers and rearward bending of said rearward flange.

12. Combination of claim 11 further comprising a separate plug insert adapted for rearward insertion through said shank, rearward flange and fingers and operative to prevent compression of said fingers toward one another for removal of said hanger from said plate member.

13. The combination of claim 12 wherein said plug insert comprises a substantially tubular member having an open forward end which, upon removal from said snap hanger is adapted to be press-fit over the tapered head portions of said flexible fingers to compress said fingers together for removal of the hanger from said plate member hole.

14. The combination of claim 13 wherein said plug insert includes a tubular rearward portion of slightly greater diameter than said flange opening for a press fit retention of said rearward portion within said flange opening.

15. The combination of claim 14 wherein said plug insert further includes a forward portion having an outer diameter substantially equal to the inner diameter of said shank for telescopic receipt therein.

16. The combination of claim 11 wherein the rearward surface of said rearward flange has an inner portion which is normally perpendicular to the axis of said shank and rearward flange for flush engagement against said plate member upon press-fit insertion of said snap hanger into said plate member hole.

17. The combination of claim 11 wherein said shank further includes a forward flange projected radially outwardly therefrom adjacent to forward end thereof.

18. The combination of claim 17 further comprising a railway car automobile wheel chock apparatus having a keyhole shaped opening with a large diameter end portion adapted to fit over said forward flange and a slot portion of a diameter greater than said shank and smaller than said forward flange for secure support of said apparatus on said wheel strap snap hanger.

19. The combination of claim 18 wherein said wheel chock apparatus comprises a wheel strap.

20. The combination of claim 18 wherein said wheel chock apparatus comprises an automotive wheel chock.

21. Method for supporting and storing an automobile wheel chock apparatus having a keyhole opening therein at a selected position along a perforated side screen of a multilevel railway car auto rack, said side screen including a plurality of holes therethrough, comprising,
providing a wheel strap snap hanger including an elongated tubular shank, a rearward flange on the rearward end of said shank to provide a collar for abutment against said side screen a rearward surface of said rearward flange having an outer portion which is inclined outwardly and forwardly, and a plurality of flexible fingers extending longitudinally rearwardly from said rearward flange, each finger including a stem portion connected to said rearward flange and a head portion of greater diameter than said neck portion and spaced rearwardly from said rearward flange by a dimension substantially equal to the thickness of said side screen to define a peripheral side screen receiving groove therebetween, said head portion having an outer surface which tapers rearwardly and inwardly and said flexible fingers being separated by respective axial slots which extend axially forwardly through said rearward flange and into said shank,
selecting a side screen hole at a position where said wheel chock apparatus is to be stored,
pressing the tapered outer surfaces of said flexible fingers into said selected hole, thereby compressing said fingers together and bending said rearward flange rearwardly,
pushing said snap hanger into said selected hole to the extent of engagement of the inclined outer portion of said rearward flange against said side screen, whereupon said fingers snap apart to engage said side screen with said peripheral side screen receiving groove,
placing said wheel chock apparatus onto said snap hanger such that said snap hanger is received in the keyhole shaped opening therein,
sliding said tubular shank into the slot portion of said keyhole shaped opening thereby releasably retaining said wheel chock apparatus on said snap hanger.

22. The method of claim 21 further comprising providing a separate tubular plug insert and inserting said insert through said shank rearward flange and fingers thereby preventing compression of said fingers toward one another for removal of the hanger from said side screen.

23. The method of claim 22 further comprising relocating said snap hanger on said side screen including withdrawing said plug insert from said snap hanger, forcing the open tubular end of said plug insert over the tapered head portions of said snap hanger flexible fingers thereby compressing said fingers together and withdrawing said fingers from said side screen hole, and reinserting said snap hanger into another selected hole in said side screen.

24. The method of claim 22 wherein said automotive wheel chock apparatus comprises a wheel strap.

25. The method of claim 22 wherein said automotive wheel chock apparatus comprises a wheel chock.

* * * * *